Jan. 12, 1954  V. STACCONE ET AL  2,665,520
TOY AUTOMOBILE WITH WINDSHIELD WIPER
Filed May 9, 1950

INVENTOR.
VALENTINE STACCONE
AND FRANK AMICO
BY
ATTORNEY

Patented Jan. 12, 1954

2,665,520

UNITED STATES PATENT OFFICE 2,665,520

TOY AUTOMOBILE WITH WINDSHIELD WIPER

Valentine Staccone and Frank Amico, Rochester, N. Y.

Application May 9, 1950, Serial No. 160,916

2 Claims. (Cl. 46—204)

The present invention relates to toys, and more especially to toy automobiles.

Children like toys which have some operating parts; and they like the operating parts to simulate the operating parts of real, full-size automobiles.

A primary object of the present invention is to provide a toy automobile having windshield wipers which in appearance and operation simulate the windshield wipers of a real automobile.

Another object of the invention is to provide a toy automobile having devices thereon which simulate windshield wipers and which are operated by the movement of the toy.

Other objects of the invention will be apparent hereinafter from the specification and from the recital of the appended claims.

Figure 1:
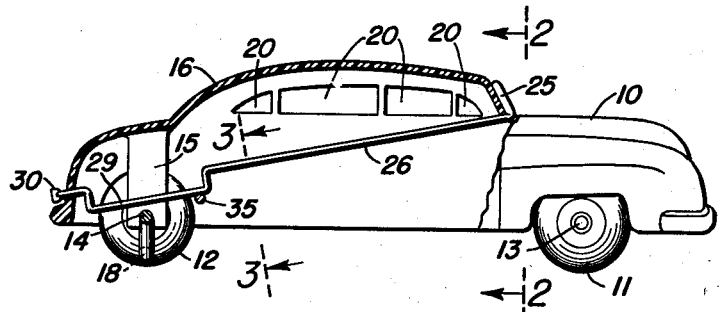
Fig. 1 is a part side elevation, part longitudinal sectional view of a toy automobile built according to one embodiment of this invention.

Referring now to the drawings by numerals of reference, 10 indicates the body of a toy automobile. This may be made of metal or a suitable plastic. The toy is provided with front wheels 11 and rear wheels 12. The front wheels 11 are secured adjacent opposite ends of an axle 13 which may be journaled in the frame 10 in a convenient manner. The rear wheels 12 are secured at opposite ends of an axle 14 that is journaled in two parallel brackets 15 which depend from the roof portion 16 of the frame of the car at the rear thereof and which may be integral with this roof portion. The axle 14 is provided with an offset portion 18 which operates the windshield wiper mechanism.

The car is provided with simulated windows 20 along the sides, simulating the windows of a real car. It is also provided with windshields 21, simulating the windshields of a real car. The windows and windshields may be made of glass but for cheaper toy models the simulated windows and windshields may be simply pressed-in portions of the car body.

In either event, there are two wiper arms 25 provided for simulating wiping of the windshields. These wiper arms in the preferred embodiment of the invention illustrated are integral with wire operating rods 26. The wire rods 26 extend through holes 28 in the car body 10 and the wiper arms 25 are terminal right-angular bends at the forward extremities of the wire rods. The two wire rods 26 diverge from one another back of the windshields and inwardly of the car body 10 and are inclined downwardly toward the rear axle 14. Each is provided with an offset portion 29 adjacent its rear end that is adapted to be engaged by the offset portion 18 of the rear axle 14 as the rear axle 14 revolves. The wire rods 26 are journaled at their rear extremities in the body of the car and are flatted off as indicated at 30, after they have been assembled in the car body, to prevent their being detached from the car.

Figure 2:
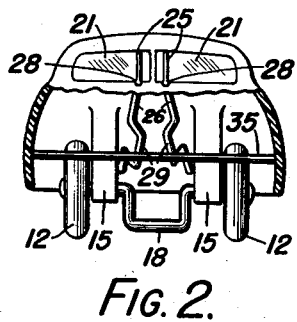
Fig. 2 is a transverse section on the line 2—2 of Fig. 1, looking in the direction of the arrows, and showing the windshield wiper members at the extremities of their respective movements in one direction.
Figure 3:
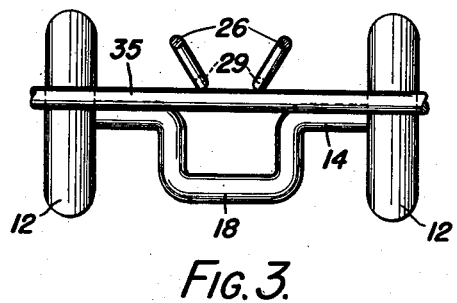
Fig. 3 is a section on the line 3—3 of Fig. 1 on an enlarged scale, looking in the direction of the arrows, and showing the operating mechanism for the windshield wipers in one position.

Extending transversely of the car body near the rear axle 14 and slightly above the same is a wire rod 35. This limits the downward movement of the operating wire rods 26 under force of gravity as the throw portion 18 of the shaft 14 rotates from the position shown in Figs. 4 and 5 to the position shown in Figs. 2 and 3. This limiting of the downward movement of the throw-portions 29 of the wire rods 26 is an important feature of the invention, because, if the rods 26 were left free to follow the throw portion 18 of the rear axle 14 by gravity, they would become locked in their down positions, and it would be impossible for the throw portion 18 to move them upwardly again. Instead, at their downward positions they come to rest on the rod 35, as clearly shown in Figs. 2 and 3, so that when the throw portion 18 of the rear axle rises again, the throw portions 29 of the rods 26 are picked up by the throw portion 18 of the rear axle, and the rods are rocked upwardly to the position shown in Figs. 4 and 5.

Figure 4:
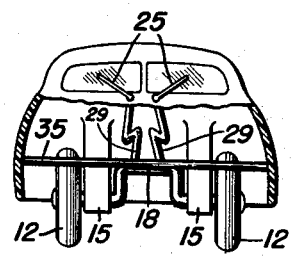
Fig. 4 is a section, similar to Fig. 2, but showing the windshield wipers and the operating mechanism therefor in another position.
Figure 5:
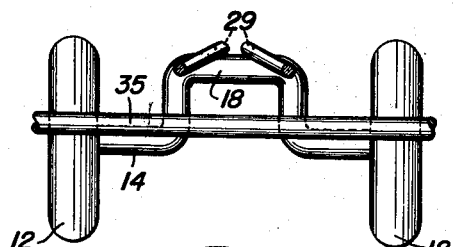
Fig. 5 is a view similar to Fig. 3 but showing the operating mechanism for the windshield wipers in another position.

As the toy is rolled along, then, it will be seen that the throw portion 18 of the rear axle will engage the throw portions 29 of the wire rods 26, rocking them up to the position shown in Figs. 4 and 5, swinging the wiper blades 25 to the positions shown in Fig. 4. As the car rolls further, the shaft 14 will continue to rotate, moving the offset, throw portion 18 downward. The offset, throw portions 29 of the wire rods 26 will follow by gravity this downward movement of the shaft, thereby swinging the wiper blades 25 to the positions shown in Fig. 2. When the offset, throw portions 29 of the rods 26 rest on the transverse rod 35, however, the downward movement of the offset portions 29 of the rods 26 will cease. From this point on, until the throw portion 18 of the rear axle returns into engagement with the rods 29 again, the windshield wipers will be stationary. It will be seen, then, that the windshield blades will swing back and forth as the car is rolled along, simulating the action of real windshield wipers on a real automobile.

While the simulated windshield wipers are shown as operated from the rear axle, it will be understood that they might also be operated from the front axle. It will be understood, also, that, if desired, provision can be made to throw the simulated windshield wipers out of operation should the child want to have the toy automobile run along without operating the simulated wipers. For this purpose rod 35 may, for instance, be made rotatable in the frame 10 and may be provided with an offset so that when the rod is rotated to one position, rods 26 will be moved out of the range of movement of the throw portion 18 of the rear axle 14 and so will not be operated thereby.

In general, then it may be said that while the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a toy automobile, the combination with a body, a simulated windshield on the body, an axle journaled in the body transversely thereof, and a pair of wheels secured to the outer ends of said axle, said axle having a parallel, offset portion between its ends forming a crank, of a rigid, one-piece wire rod extending longitudinally of the body and journaled adjacent its ends in the body and having an arm integral therewith at one end thereof which is movable across said windshield and which simulates a wiper, said rod having a parallel offset portion between its ends, which is adapted to be engaged by the offset portion of said axle, as the axle rotates, and means for limiting movement of the offset portion of the rod downwardly under force of gravity.

2. In a toy automobile, the combination with a body, a simulated windshield on the body, an axle journaled in the body transversely thereof, and a pair of wheels secured to the outer ends of the axle, said axle having a parallel, offset portion between its ends forming a crank, of a pair of rigid, single-piece wire rods extending longitudinally of the body and journaled adjacent their ends in the body, each of said rods having an arm integral therewith at one end thereof which is movable across said windshield and which simulates a wiper, each of said rods having a parallel, offset portion between its ends which is adapted to be engaged by the offset portion of the axle as the axle rotates, and a rod mounted in the body transversely thereof adjacent to said axle in position to engage the offset portions of the rods to limit downward movement thereof under force of gravity.

VALENTINE STACCONE.
FRANK AMICO.

References Cited in the file of this patent

UNITED STATES PATENTS

| Number | Name | Date |
|---|---|---|
| 895,312 | Stubert | Aug. 4, 1908 |
| 1,053,170 | Hendron | Feb. 18, 1913 |
| 1,576,887 | Wilson | Mar. 16, 1926 |
| 1,646,169 | Rosenbaum | Oct. 18, 1927 |
| 1,882,595 | Hewitt | Oct. 11, 1932 |
| 2,055,848 | Marx | Sept. 29, 1936 |
| 2,089,885 | Fisher | Aug. 10, 1937 |
| 2,137,950 | Ranney | Nov. 22, 1938 |
| 2,382,091 | Olson | Aug. 14, 1945 |

FOREIGN PATENTS

| Number | Country | Date |
|---|---|---|
| 729,540 | France | A. D. 1932 |